US012434476B2

(12) United States Patent
Praharaj et al.

(10) Patent No.: US 12,434,476 B2
(45) Date of Patent: Oct. 7, 2025

(54) SYSTEM AND METHOD FOR PRINTING INK IMAGES IN ACCORDANCE WITH SUSTAINABILITY GOALS

(71) Applicant: Xerox Corporation, Norwalk, CT (US)

(72) Inventors: Seemit Praharaj, Webster, NY (US); Douglas K. Herrmann, Webster, NY (US); Jason M. LeFevre, Penfield, NY (US); Jorge A. Alvarez, Webster, NY (US); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 177 days.

(21) Appl. No.: 18/453,866

(22) Filed: Aug. 22, 2023

(65) Prior Publication Data

US 2025/0065631 A1 Feb. 27, 2025

(51) Int. Cl.
*B41J 2/17* (2006.01)
*B41J 2/165* (2006.01)
*B41J 2/21* (2006.01)
*B41J 29/17* (2006.01)

(52) U.S. Cl.
CPC ........... *B41J 2/1652* (2013.01); *B41J 2/1721* (2013.01); *B41J 2/211* (2013.01); *B41J 29/17* (2013.01); *B41J 2/1735* (2024.05)

(58) Field of Classification Search
CPC ........ B41J 2/1721; B41J 2/1728; B41J 2/1652
See application file for complete search history.

(56) References Cited

U.S. PATENT DOCUMENTS

| | | | |
|---|---|---|---|
| 5,157,421 A | 10/1992 | Kitahara | |
| 5,221,935 A | 6/1993 | Uzita | |
| 5,400,066 A | 3/1995 | Matsumoto et al. | |
| 6,145,958 A | 11/2000 | Medin et al. | |
| 6,281,911 B1 | 8/2001 | Nakazawa et al. | |
| 2011/0199423 A1* | 8/2011 | Shimazaki | B41J 2/16508 347/29 |
| 2021/0187948 A1* | 6/2021 | Praharaj | B41J 29/393 |
| 2021/0187953 A1* | 6/2021 | Liu | B41J 2/1714 |

FOREIGN PATENT DOCUMENTS

| | | |
|---|---|---|
| JP | 2000190528 A | 7/2000 |

OTHER PUBLICATIONS

Extended European Search Report corresponding to European Patent Application No. 24191587.5 dated Jan. 15, 2025. (8 Pages).

* cited by examiner

*Primary Examiner* — Scott A Richmond

(74) *Attorney, Agent, or Firm* — Maginot Moore & Beck LLP

(57) ABSTRACT

An inkjet printer includes a waste ink treatment system and a humidification chamber to separate waste ink produced by a printhead maintenance station into solid ink pigment particles and a solvent stream and use the solvent stream to maintain inkjets in the printheads of the inkjet printer in operational status. The waste ink treatment system mixes the waste ink with a metal salt to precipitate the solid ink pigment particles out of the waste ink. The solvent stream remaining after the precipitation of the pigment particles is humidified and directed to air baffles positioned on opposite sides of each printhead in every other printhead module in the process direction. A kit is provided to retroactively modify an existing inkjet printer to treat the waste ink and use the solvent stream to maintain the operational status of the inkjets in the printheads of the inkjet printer.

20 Claims, 8 Drawing Sheets

SYSTEM AND METHOD FOR PRINTING INK IMAGES IN ACCORDANCE WITH SUSTAINABILITY GOALS

TECHNICAL FIELD

This disclosure relates generally to devices that produce ink images on media, and more particularly, to the printing of ink images in accordance with sustainability goals.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in the cross-process direction to double the number of pixels per inch to increase the density of a line of the color of ink ejected by the printheads in the two modules. As used in this document, the term "process direction" means the direction of movement of the image receiving surface as it passes the printheads in the printer and the term "cross-process direction" means a direction that is perpendicular to the process direction in the plane of the image receiving surface.

Inkjets, especially those in printheads that eject aqueous inks, need to fire regularly to help prevent the ink in the nozzles from drying. Sometimes the nozzles in a printhead dry because the inkjets have ejected a substantial amount of ink to form high coverage areas in an ink image. The operation of a high proportion of inkjets in a portion of the faceplate on the printhead can produce a high number of satellite drops that tend to adhere to the faceplate. Satellite drops are small ink drops that separate from the larger drops that travel from the nozzles to the image receiving substrates. The buildup of these satellite drops on a faceplate can clog nozzles in the faceplate. Additionally, if the inkjets in a printhead are not operated frequently enough, such as when low ink area coverage image portions are printed, then the ink within an inkjet can dry and render the inkjet inoperative. To maintain the operational status of the inkjets, the printhead modules are moved from positions opposite the path of the image receiving substrates to printhead maintenance stations where the printheads are purged. Purging a printhead means a pressurized gas or liquid is applied to the ink supply chambers within a printhead to force ink from the chamber into the nozzles where the ink is emitted from the nozzles onto the faceplate. One or more wipers are then moved across the faceplate to remove the purged ink from the faceplate into a waste ink receptacle.

Disposal of the waste ink can present environmental issues. Rather than directing the waste ink into a bottle that is eventually transported and stored in perpetuity as aqueous ink, the ink can be heated to a temperature sufficient to evaporate the water or other solvent from the ink. This evaporation reduces the volume of the waste ink and the solids can be disposed in a more environmentally friendly manner. Heating the waste ink, however, requires energy not used in the primary function of the printing, namely, ink image production. Consequently, energy costs of operating an inkjet printer can be significantly higher than they need be. Thus, inkjet printers would benefit from being able to treat waste ink in a manner that reduces the cost of operating the inkjet printers without adversely impacting the environment.

SUMMARY

A color inkjet printer is configured to treat waste ink in a manner that reduces the cost of operating the inkjet printers without adversely impacting the environment. The color inkjet printer includes a printhead maintenance station configured to perform at least one purge cycle on at least one printhead in the inkjet printer to produce waste ink; a waste ink treatment system fluidly coupled to the printhead maintenance system to receive the waste ink from the printhead maintenance station and the waste ink treatment system being configured to separate the waste ink into solid ink pigment particles and a solvent stream; and a humidification chamber fluidly coupled to the waste ink treatment system to receive the solvent stream from the waste ink treatment system, the humification chamber being configured to humidify the solvent stream received from the waste ink treatment system and direct the humidified solvent stream into a print zone of the inkjet printer.

A method of operating a color inkjet printer treats waste ink in a manner that reduces the cost of operating the inkjet printers without adversely impacting the environment. The method includes performing at least one purge cycle on at least one printhead in the inkjet printer to produce waste ink; separating the waste ink into solid ink pigment particles and a solvent stream; humidifying the solvent stream; and directing the humidified solvent stream into a print zone of the inkjet printer.

A kit can be retroactively installed in a color inkjet printer so the printer can be operated to treat waste ink in a manner that reduces the cost of operating the inkjet printers without adversely impacting the environment. The kit includes a replacement waste ink receptacle configured for egress of waste ink from a printhead maintenance station; a waste ink treatment system; a humidification chamber; three pneumatic pressure devices; and two air baffles with a U-shaped clip for each printhead in half of a number of printhead modules in a printer.

BRIEF DESCRIPTION OF THE DRAWINGS

The foregoing aspects and other features of a color inkjet printer, color inkjet printer operational method, and kit that can be installed in an inkjet printer so the printer treats waste ink in a manner that reduces the cost of operating the inkjet printers without adversely impacting the environment are explained in the following description, taken in connection with the accompanying drawings.

DETAILED DESCRIPTION

Figure 1:
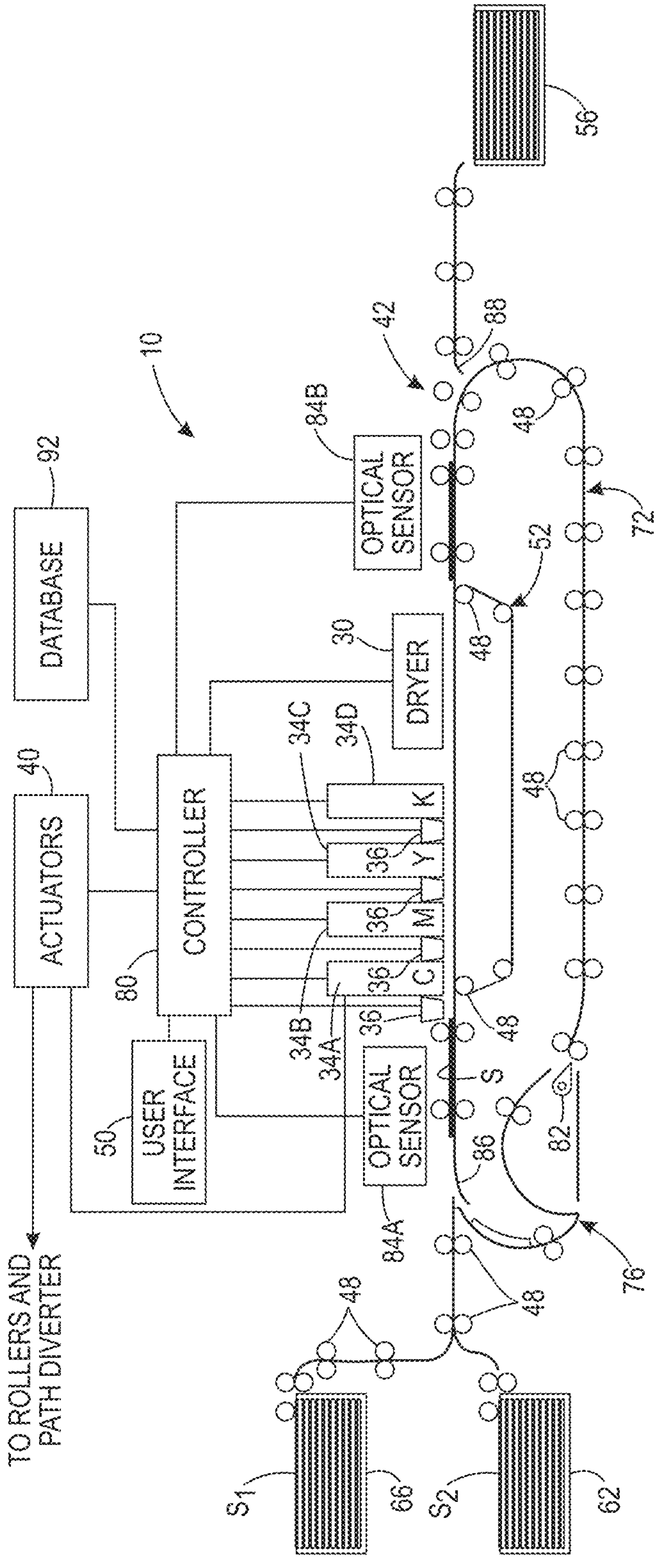
FIG. 1 is a schematic drawing of a color inkjet printer that treats waste ink in a manner that reduces the cost of operating the inkjet printers without adversely impacting the environment.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

FIG. 1 depicts a high-speed color inkjet printer 10 that treats waste ink produced by a printhead maintenance station and recirculates the solvent stream into the print zone of a printer to attenuate nozzle malfunction in the printheads of the printer. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
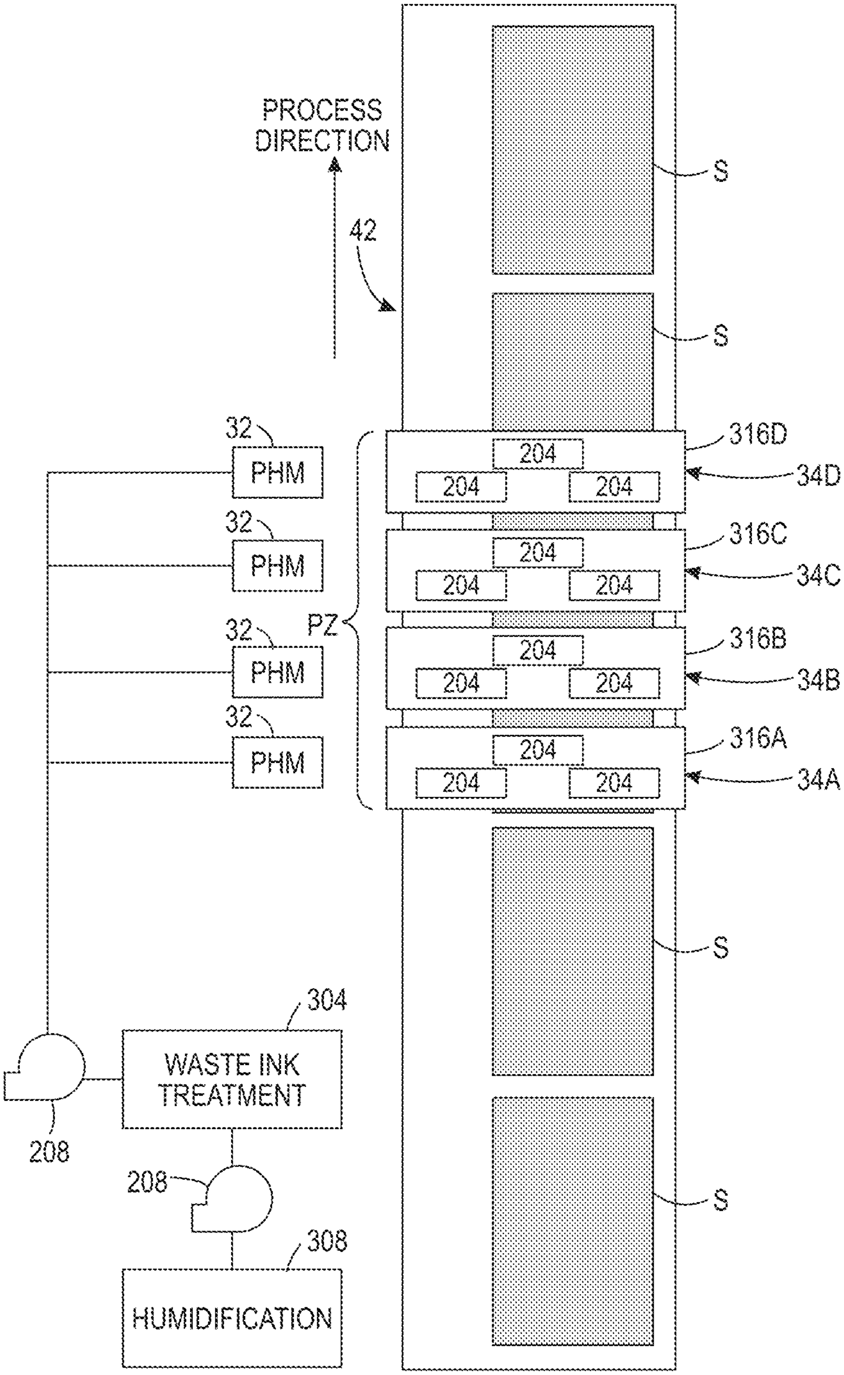
FIG. 2 depicts the print zone of the printer shown in FIG. 1 and the printhead maintenance stations positioned adjacent to the print zone.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively. Adjacent to the print zone PZ are four printhead maintenance stations (PHM) 32. On a periodic basis or when image quality metrics indicate that the number of inoperative inkjets in a printhead in one of the printhead modules exceeds a predetermined threshold, printing operations are halted and at least the printhead module in which the printhead having the excessive number of inoperative inkjets is located is moved from the print zone PZ to a position opposite the adjacent printhead maintenance station 32. The printhead maintenance station is operated to purge ink through the nozzles in the printheads in a known manner. The waste ink produced by the one or more purge cycles performed on one or more printheads is collected within a receptacle in the printhead maintenance station. This waste ink is moved by a pump 208 or some other type of pneumatic device to the waste treatment system 304. The waste treatment system 304 separates the solvent in the waste ink from the solid ink pigment particles so the solid ink pigment particles from the waste ink received from all of the printhead maintenance stations 32 can be collected in a single receptacle of the system 304 for removal and the solvent stream is directed to the humidification chamber 308 for further processing as described in more detail below. As used in this document, the term "print zone" means an area of a media transport opposite the printheads of an inkjet printer.

With further reference to FIG. 1, the printed image exits the print zone PZ and passes under an image dryer 30 after the ink image is printed on a sheet S. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Controller 80 operates at least one of the actuators 40 to rotate a pivoting member at position 88 to either direct a sheet to receptacle 56 or to return path 72. A sheet S is moved by the rotation of rollers along the return path 72 in a direction opposite to the direction of movement in the process direction past the printheads. Pivoting member 82 is operated by the controller 80 to either direct the sheet along a curved portion of the return path 72 into inverter 76 so the sheet is turned over for duplex printing or along the straight portion of the return path 72. When the sheet follows the straight portion, the inverter 76 is bypassed and the side of the sheet previously printed can be printed again. The controller operates one of the actuators 40 to move the pivoting member 82 clockwise to direct a sheet into the inverter 76 and counterclockwise to bypass the inverter. Regardless of whether the substrate is inverted or not, it merges into the job stream being carried by the media transport 42 when controller 80 operates another actuator 40 to rotate pivoting member 86 to provide ingress of a sheet S from return path 72 to the job stream.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are inserted at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory computer readable medium associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICS, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

In further detail, FIG. 1 includes air baffles 36 that receive a humidified solvent stream from the humidification chamber 308 and direct the humidified solvent stream into the print zone so the media transport 42 and the sheets S being carried by the media transport pull the humidified solvent stream through the print zone to increase humidity in the print zone. The increased humidity helps attenuate the drying of ink on the faceplates of the printheads and the ink within nozzles of the printheads to lengthen the operational status of the inkjets in the printheads.

Figure 3:
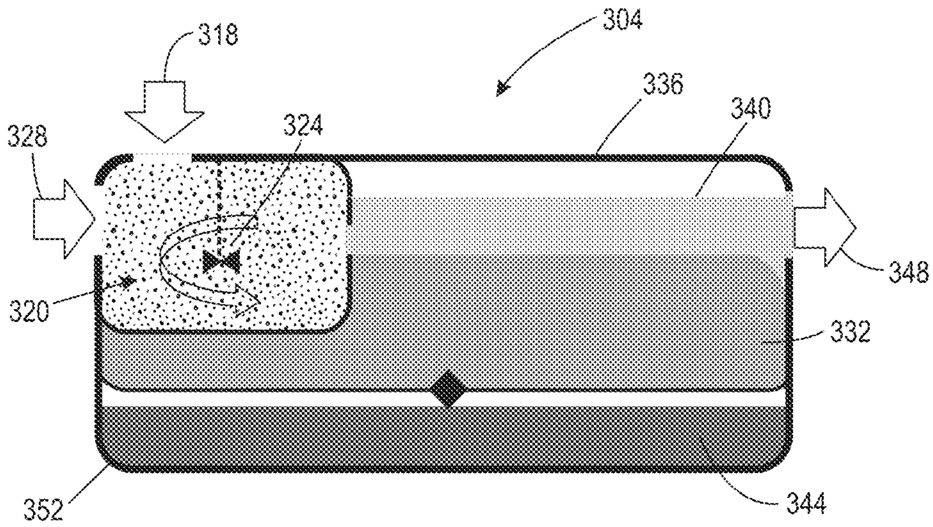
FIG. 3 shows a waste ink treatment system that receives waste ink from a printhead maintenance station and separates a solvent from the solid ink pigment particles so the solid ink particles can be collected in a receptacle that is configured for removal from the treatment system.

FIG. 3 depicts the waste ink treatment system 304. The waste ink 318 is moved by a pneumatic pressure produced by a pneumatic device, such as a pump 208 (FIG. 2), into a mixing chamber 320. A member 324 rotated by an actuator 40 mixes the entering waste ink with a metal salt received through another port 328. The positive pressure of the entering waste ink and metal salt pushes a mixed composition of metal salt and waste ink 332 into a settling tank 336 where the coagulating interaction of the metal salt with the waste ink forms a solvent stream 340 and precipitates the solid ink pigment particles 344 out of the waste ink. These particles 344 drop into a receptacle 352 that is configured for removal from the settling tank 336 so the solid ink pigment particles can be emptied from the receptacle. A source of pneumatic pressure can be fluidly coupled to the exhaust port 348 to remove the solvent stream 340 from the settling tank 336. The metal salt mixed with the waste ink can be any suitable metal salt that interacts with the solvent of the waste ink to precipitate the solid ink pigment particles from the waste ink. Examples of such metal salt are magnesium chloride and calcium chloride for aqueous ink. Other metal salts of sodium, potassium, barium, and aluminum can be used to precipitate the pigment particles. The pneumatic pressure source can be a fan, a vacuum, or the like. While the settling tank has been described as receiving the metal salt form a supply of metal salt external to the mixing chamber, a bed of metal salt can be placed within the mixing chamber and renewed from time to time. As used in this document, the term "waste ink treatment system" means one or more components configured to separate waste ink into a solvent stream and solid ink pigment particles and the term "waste ink" means ink removed from a printhead that is not used to form a portion of a printed ink image. As used in this document, the term "solvent stream" means a liquid solvent in an ink after the liquid solvent has been separated from the solid ink pigment particles in the ink by a waste ink treatment system. As used in this document, the term settling tank means a partially enclosed volume within a waste ink treatment system where solid ink pigment particles precipitate out of a waste ink mixed with a metal salt. As used in this document, the term "mixing chamber" means a partially enclosed volume where a metal salt is mixed with waste ink.

Figure 4:
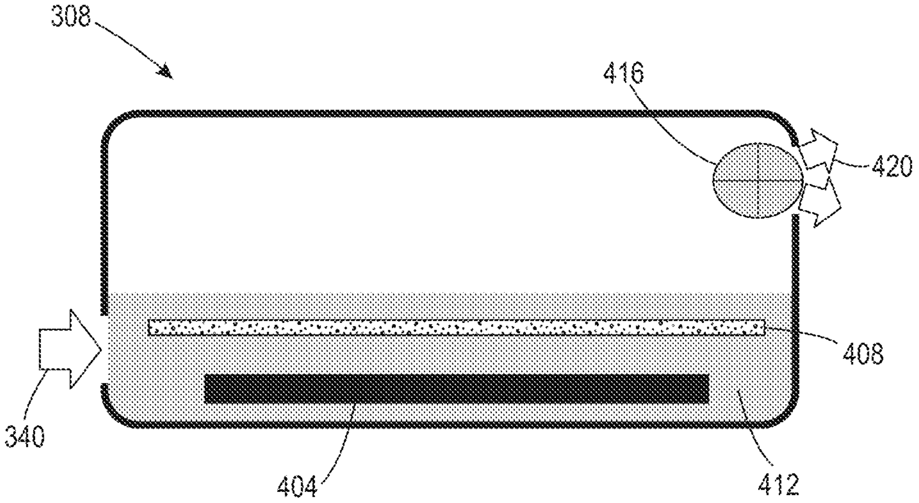
FIG. 4 shows a humidification chamber that receives a solvent stream from the waste ink treatment system of FIG. 3 and treats the solvent stream for use in the print zone of the inkjet printer of FIG. 1.

FIG. 4 depicts a humidification chamber 308 that makes the solvent stream 344 suitable for use in the print zone PZ. The chamber 308 includes a heater 404 and a diffuser 408. The solvent stream 344 enters the space above a supply of water 412 in the chamber 308. The heating and agitation of the water with the heater 404 and diffuser 408, respectively, produces a water vapor that mixes with the solvent stream. This humidified solvent stream is pushed or pulled by a pneumatic pressure device 416, such as a fan or vacuum, respectively, into conduits fluidly coupled to exhaust port 420 that are fluidically connected to the baffles 36. As used in this document, the term "humidification chamber" means one or more components configured to produce water vapor and mix the water vapor with a solvent stream. As used in this document, the term "pneumatic pressure device" means a device configured to push or pull a fluid through a conduit. The heater 404 may be a convective heater, an electrical resistance heater, an infrared heater, an inductive heater, and the like. The diffuser may be an ultrasonic or mechanical agitating device.

Figure 5:
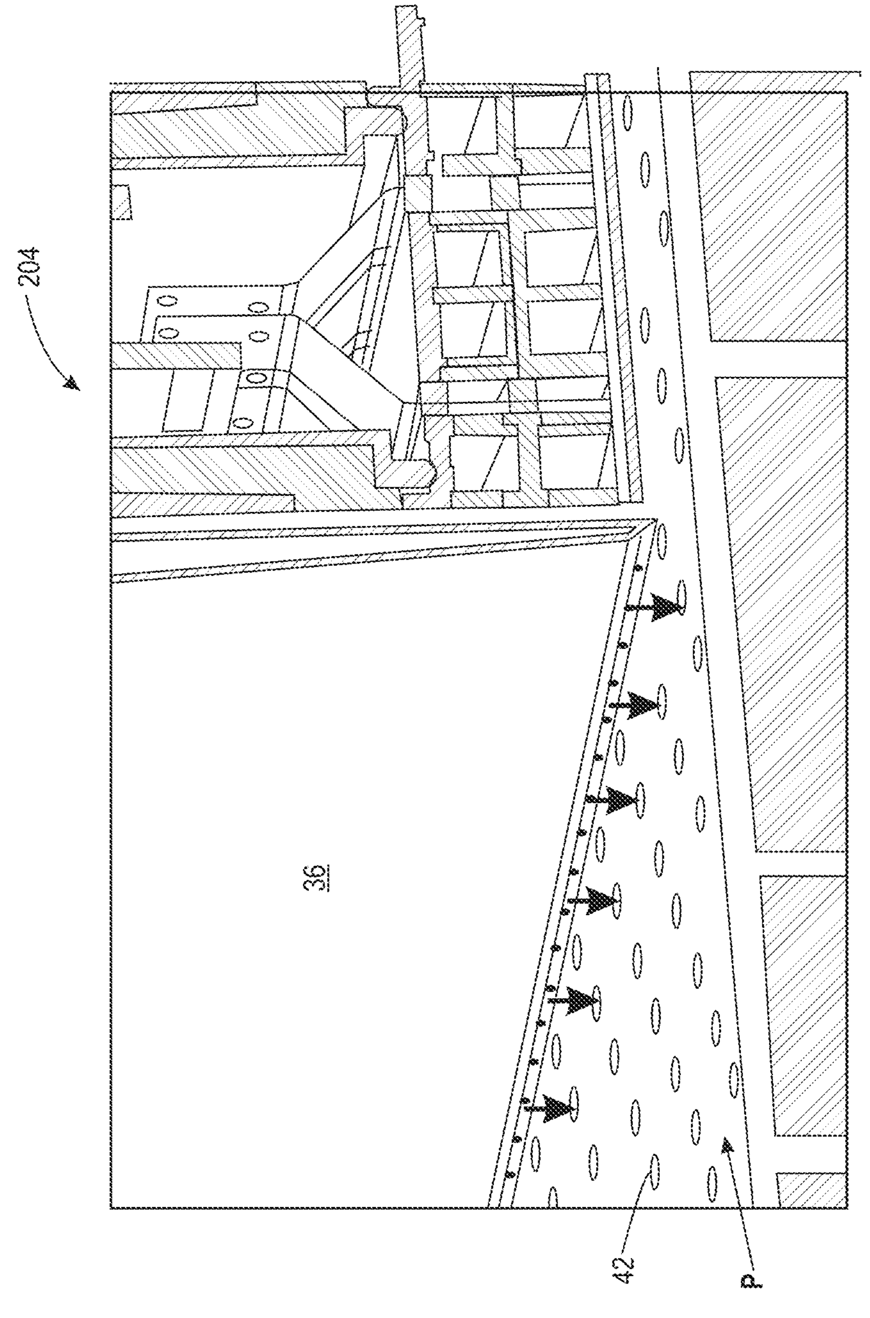
FIG. 5 shows an air baffle system that can be fluidly coupled to the humidification chamber of FIG. 3 and added to a printhead in the inkjet printer of FIG. 1 so the treated solvent stream can be dispersed into the print zone of FIG. 2.

FIG. 5 shows an air baffle 36 mounted to the leading edge of a printhead 204 in the process direction P so the humidified solvent stream 344 received from the humidification chamber 308 is directed towards the media transport 42 and media sheets S carried by the transport. As used in this document, the term "air baffle" means a structure that encloses a volume of air and is configured to allow air to flow from at least one opening in the structure at one end to at least one other opening at another end of the structure. The movement of the media sheets and the media transport carries the humified solvent stream past the printheads to infuse the environment of the printheads with water and solvent vapor. The water and solvent vapors help keep the ink in the nozzles of the printheads and on the faceplates of the printheads from drying. Thus, the operational status of the printheads is extended.

Figure 6:
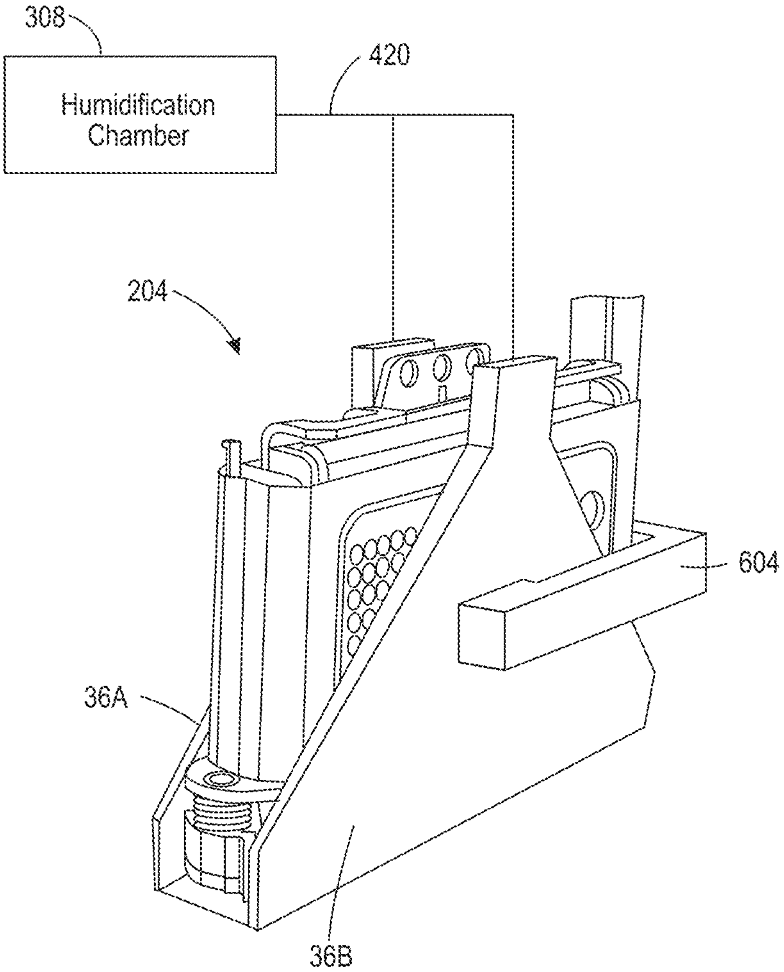
FIG. 6 shows one way in which air baffles can be coupled to the humification chamber of FIG. 4 and installed in the inkjet printer of FIG. 1.
Figure 7:
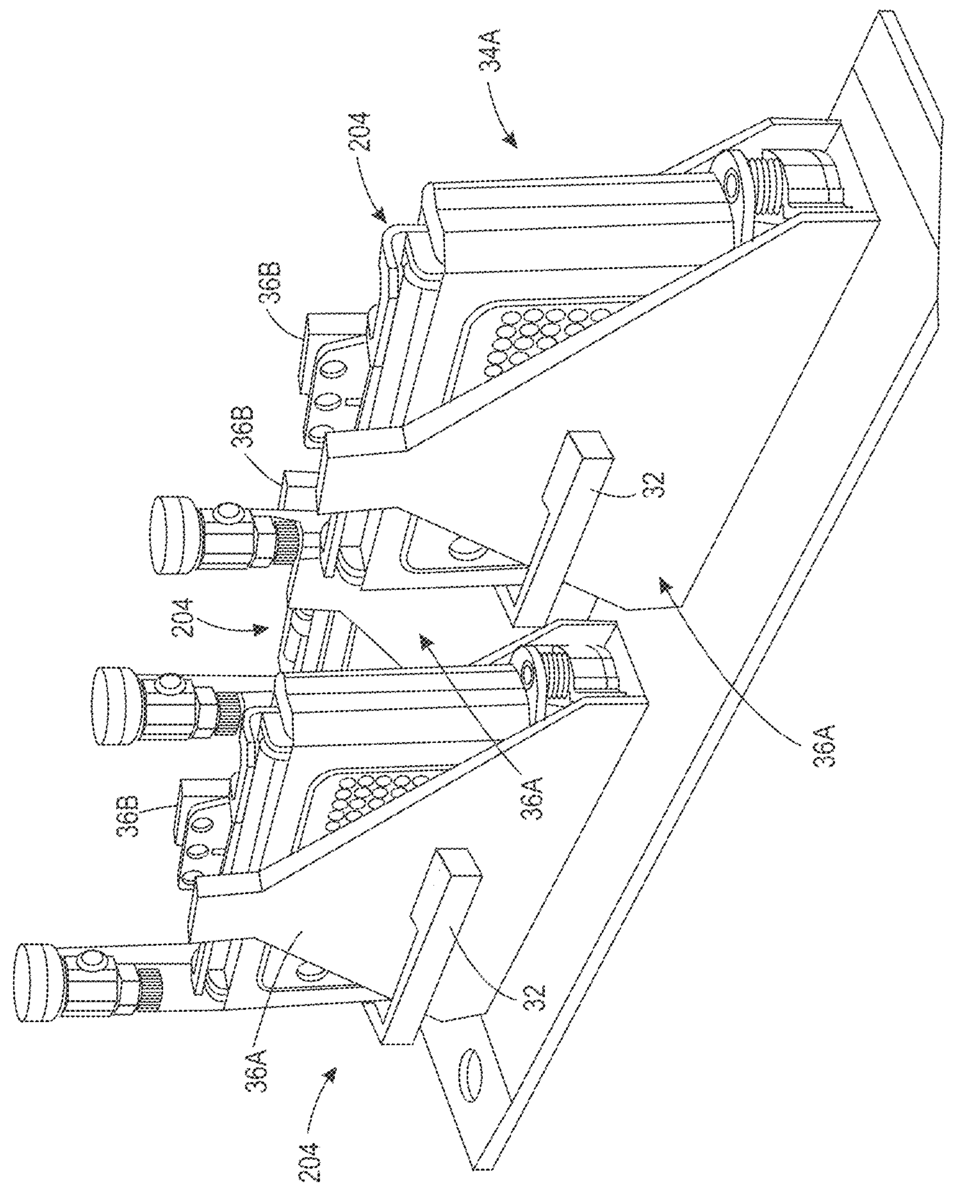
FIG. 7 shows an embodiment of a printhead module configured with three printheads and each printhead has a pair of air baffles mounted to the opposite faces of each printhead.

FIG. 6 shows one way in which air baffles coupled to the humification chamber 308 can be installed in a printer. Rather than mounting a single baffle to the leading face of each printhead in each printhead module, a U-shaped clip 604 is used to secure air baffles 36A and 36B to opposite faces of the printheads in every other printhead module. The baffles 36A and 36B are installed by positioning a U-shaped clip so the two legs of the clip urge the air baffles against the printhead. Other means of securing the air baffles to opposite sides of the printhead can be used. The air baffles 36A and 36B are pneumatically coupled to the exhaust of humidification chamber 308 to direct the humified solvent stream into the print zone of the printer. In one embodiment, the humified solvent stream exits the air baffles at 1 meter/second. This exit velocity corresponds well with the media transport speed of 1300 mm/second in one embodiment. Of course, the speed of the exiting air can vary to correspond with the media transport speed in other printer embodiments. FIG. 7 shows an embodiment of printhead module 34A configured with three printheads 204 and each printhead has a pair of air baffles 36A and 36B mounted to the opposite faces of each printhead. The arrow P indicates the process direction of the media that passes the printhead assembly 34A. Every other printhead module of FIG. 1, namely, module 34C is similarly configured.

Figure 8:
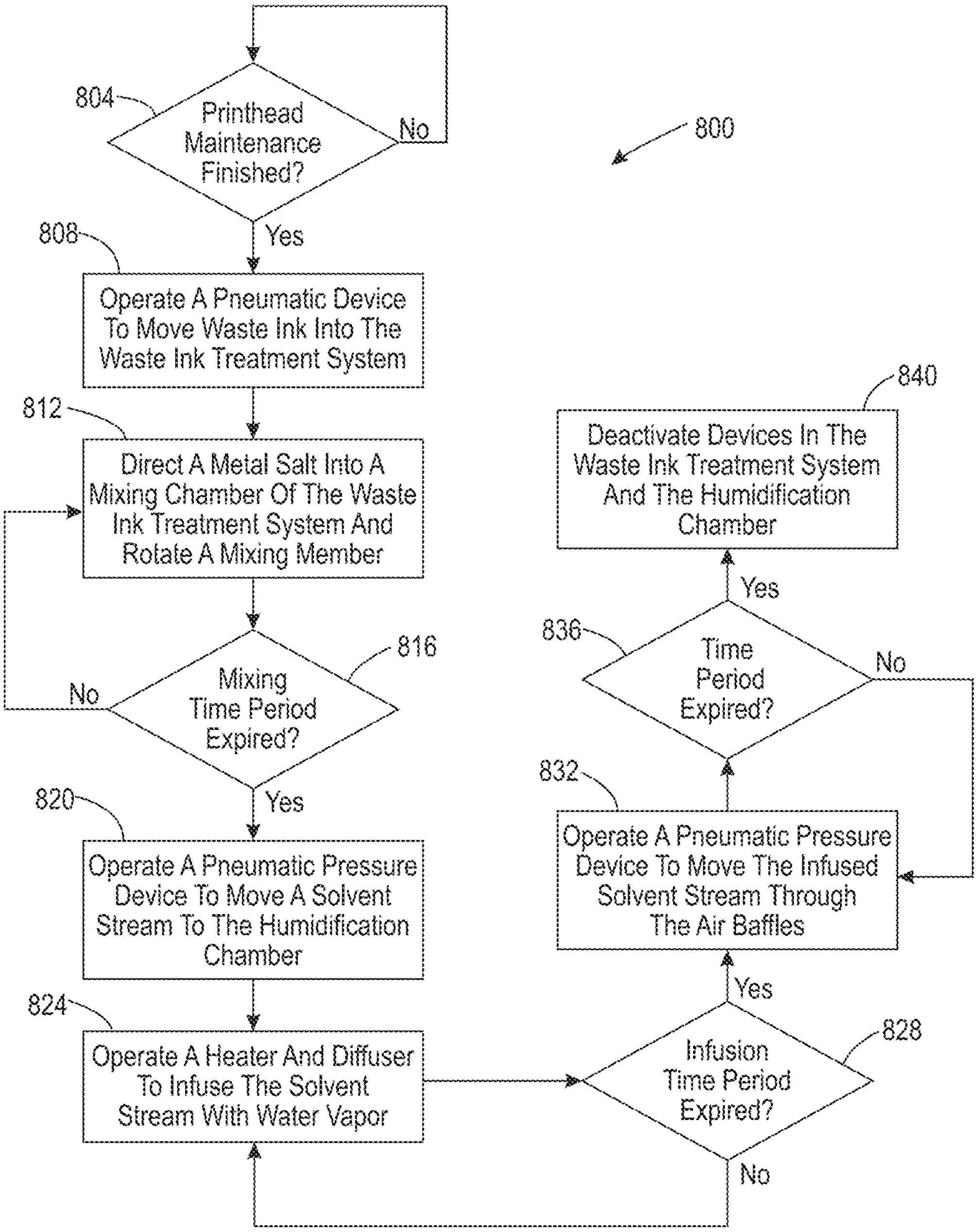
FIG. 8 is a flow diagram for operating the waste treatment system and humidification chamber of the printer.

A process 800 for operating the waste ink treatment system and humidification chamber of an inkjet printer configured with air baffles for at least some of the printheads in the printer is shown in FIG. 8. In the description of the process, statements that the process is performing some task or function refers to a controller or general purpose processor executing programmed instructions stored in non-transitory computer readable medium operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to perform one or more tasks or functions described herein. Additionally, the steps of the method may be performed in any feasible chronological order, regardless of the order shown in the figures or the order in which the processing is described.

The process 800 of FIG. 8 begins by detecting the return of at least one printhead module to its printing position after at least one purge cycle has been performed on at least one printhead in the at least one printhead module (block 804). The pneumatic device 208 between the waste ink receptacle of the printhead maintenance station and the entry into the mixing chamber of the waste ink treatment system is activated to discharge waste ink from the printhead maintenance station into the mixing chamber of the waste ink treatment system (block 808). A pressure device is operated to move a metal salt into the waste ink in the mixing chamber and the actuator that rotates the mixing member is activated (block 812). After a predetermined time period has expired that is sufficient to coagulate the solid ink pigment particles from the waste ink (block 816), a pneumatic pressure device is activated to move a resulting solvent stream from the settling tank to the humidification chamber (block 820). The heater and diffuser in the water pool of the humification chamber are activated to infuse the solvent stream with water vapor (block 824). After the expiration of another predetermined period of time (block 828), a pneumatic pressure device is activated to move the humidified solvent stream into the air baffles mounted to printheads in the printhead modules (block 832). After the expiration of a time period sufficient to permit the humidified solvent stream produced from the waste ink to be directed into the print zone (block 836), the devices activated in the waste ink treatment system and humidification chamber are deactivated (840).

To retrofit a printer for operating the printer as described above with respect to FIG. 8, a kit containing a replacement waste ink receptacle for a printhead maintenance station, a waste ink treatment system, a humidification chamber, a metal salt supply, three pneumatic pressure devices is provided along with two baffles with a U-shaped clip for each printhead in half of the printhead modules in a printer. The waste receptacle of the printhead maintenance station is removed and the replacement waste ink receptacle is installed in its place. The replacement waste ink receptacle has an exit port. After the waste ink treatment system and humidification chamber are installed, a conduit with a pneumatic pressure device is installed to connect the replacement waste ink receptacle of the printhead maintenance station with the waste ink treatment system and a conduit with a pneumatic pressure device is installed to connect the waste ink treatment system with humidification device. For each printhead in the first printhead module in the process direction and each printhead in every other printhead module thereafter, a baffle is positioned on each side of the printheads in those modules and the U-shaped clip is positioned so each leg of the clip rests against the external surface of each baffle to compress the baffles against each printhead. Each baffle is fluidically connected by a conduit with a pneumatic pressure device to the exit port of the humidification chamber. A non-transitory computer readable medium on which programmed instructions are stored is operatively connected to the controller so the controller can execute the instructions for determining when a printhead maintenance operation has concluded and operate the waste ink treatment system and humidification chamber to infuse the print zone environment with a humidified solvent stream.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:

a printhead maintenance station configured to perform at least one purge cycle on at least one printhead in the inkjet printer to produce waste ink;

a waste ink treatment system fluidly coupled to the printhead maintenance system to receive the waste ink from the printhead maintenance station and the waste ink treatment system being configured to separate the waste ink into solid ink pigment particles and a solvent stream; and a humidification chamber fluidly coupled to the waste ink treatment system to receive the solvent stream from the waste ink treatment system, the humification chamber being configured to humidify the solvent stream received from the waste ink treatment system and direct the humidified solvent stream into a print zone of the inkjet printer.

2. The inkjet printer of claim 1, the waste ink treatment system further comprising:

a mixing chamber being configured to produce a mixed composition with the waste ink;

a settling tank that is fluidly coupled to the mixing chamber to receive the mixed composition to enable solid ink pigment particles to settle out of the mixed composition and form the solvent stream.

3. The inkjet printer of claim 2, the mixing chamber further comprising:

a member within the mixing chamber that is configured to rotate to mix a metal salt with the waste ink to form the mixed composition.

4. The inkjet printer of claim 3, the waste ink treatment system further comprising:

a receptacle that is configured for selective installation in the waste ink treatment system and positioned within the waste ink treatment system to receive the solid ink pigment particles.

5. The inkjet printer of claim 4, the humidification chamber further comprising:

a reservoir configured to hold a volume of water within the humidification chamber;

a heater configured to heat the volume of water;

a diffuser configured to agitate the supply of water, the heated and agitated supply of water producing water vapor that mixes with the solvent stream to produce a humidified solvent stream.

6. The inkjet printer of claim 5 wherein the heater is one of a convective heater, an electrical resistance heater, an infrared heater, and an inductive heater.

7. The inkjet printer of claim 5 wherein the diffuser is an ultrasonic diffuser.

8. The inkjet printer of claim 5 further comprising:

a first pneumatic pressure device configured to move waste ink from the printhead maintenance station to the mixing chamber of the waste treatment system;

a second pneumatic pressure device configured to move the solvent stream from the waste ink treatment system to the humidification chamber; and a third pneumatic pressure device configured to move the humidified solvent stream from the humidification chamber to the print zone of the inkjet printer.

9. The inkjet printer of claim 8 further comprising:

a first housing positioned on a leading side of at least one printhead in the process direction, the first housing being fluidly coupled to the humidification chamber to receive a portion of the humidified solvent stream and direct the portion of the humidified solvent stream into the print zone of the inkjet printer.

10. The inkjet printer of claim 9 further comprising:

a plurality of printhead modules configured to follow one another in the process direction, all printheads in a first printhead module that leads the configuration of printheads in the process direction having the first housing and a second housing positioned on opposite sides of all the printheads in the first printhead module, the second housing being fluidly coupled to the humidification chamber to receive another portion of the humidified solvent stream and direct the other portion of the humidified solvent stream into the print zone of the inkjet printer; and every other printhead module following the first printhead module in the process direction having the first housing and the second housing positioned on opposite sides of all the printheads within the every other printhead module following the first printhead module in the process direction.

11. A method of operating an inkjet printer comprising:

performing at least one purge cycle on at least one printhead in the inkjet printer to produce waste ink;

separating the waste ink into solid ink pigment particles and a solvent stream;

humidifying the solvent stream; and directing the humidified solvent stream into a print zone of the inkjet printer.

12. The method of claim 11 further comprising:

directing the humidified solvent stream into a first opening of a first housing positioned on a leading edge of the at least one printhead; and emitting the humidified solvent stream through at least one second opening in the first housing to direct the humidified solvent stream into the print zone of the inkjet printer.

13. The method of claim 12, the separation of the waste ink into the solid ink pigment particles and the solvent stream further comprising:

producing a mixed composition by mixing the waste ink with a metal salt to precipitate the solid ink pigment particles out of the waste ink.

14. The method of claim 13 further comprising:

receiving the solid ink pigment particles that precipitate out of the mixed composition in a receptacle.

15. The method of claim 14, the mixing of the waste ink with the metal salt chamber further comprising:

rotating a member with an actuator to mix the metal salt with the waste ink to form the mixed composition.

16. The method of claim 15 further comprising:

selectively removing the receptacle to discard the solid ink pigment particles.

17. The method of claim 16, the humidification of the solvent stream further comprising:

heating and agitating a supply of water to produce water vapor; and mixing the water vapor with the solvent stream to produce a humidified solvent stream.

18. The method of claim 17, the heating of the water supply further comprising:

heating the water supply with one of a convective heater, an electrical resistance heater, an infrared heater, and an inductive heater.

19. The method of claim 18, the agitating of the water supply further comprising:

agitating the water supply with an ultrasonic diffuser.

20. The method of claim 19 further comprising:

directing the humidified solvent stream to a second housing positioned on an opposite side of the at least one printhead in the process direction.

* * * * *